US012772236B2

(12) United States Patent
Savas et al.

(10) Patent No.: US 12,772,236 B2
(45) Date of Patent: Oct. 20, 2026

(54) SYSTEMS AND METHODS FOR NEW-RADIO-AWARE LTE SCHEDULING

(71) Applicant: Verizon Patent and Licensing Inc., Basking Ridge, NJ (US)

(72) Inventors: Alpaslan Gence Savas, Summit, NJ (US); Mathew Thomas, Madison, NJ (US); Sachin Vargantwar, Cumming, GA (US); Chin Chiu, Allen, TX (US); Maulik Shah, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 410 days.

(21) Appl. No.: 18/487,281

(22) Filed: Oct. 16, 2023

(65) Prior Publication Data

US 2024/0040565 A1 Feb. 1, 2024

Related U.S. Application Data

(63) Continuation of application No. 17/475,432, filed on Sep. 15, 2021, now Pat. No. 11,818,710.

(51) Int. Cl.

| | |
|---|---|
| ***H04W 72/1268*** | (2023.01) |
| ***H04B 17/336*** | (2015.01) |
| ***H04L 5/14*** | (2006.01) |
| ***H04W 52/14*** | (2009.01) |
| ***H04W 52/28*** | (2009.01) |
| ***H04W 52/34*** | (2009.01) |
| ***H04W 72/56*** | (2023.01) |
| ***H04W 76/15*** | (2018.01) |
| ***H04W 88/06*** | (2009.01) |

(52) U.S. Cl.
CPC ...... *H04W 72/1268* (2013.01); *H04B 17/336* (2015.01); *H04L 5/14* (2013.01); *H04W 88/06* (2013.01)

(58) Field of Classification Search
CPC . H04W 72/1268; H04W 88/06; H04W 72/56; H04W 52/146; H04W 52/346; H04W 52/281; H04W 76/15; H04B 17/336; H04L 5/14; H04L 5/1469
See application file for complete search history.

(56) References Cited

U.S. PATENT DOCUMENTS

| | | | | |
|---|---|---|---|---|
| 8,401,055 B1 * | 3/2013 | Campbell | ............ | H04B 1/7115 375/150 |
| 2013/0042276 A1 * | 2/2013 | Payette | ................ | H04W 28/22 725/62 |
| 2014/0011535 A1 | 1/2014 | Jeon | | |

(Continued)

*Primary Examiner* — Xuan Lu

(57) ABSTRACT

New Radio (NR)-aware LTE scheduling is provided. An access station for a radio access network includes a first scheduling function. The first scheduling function identifies a User Equipment (UE) device that has a first active wireless connection and a second active wireless connection to the radio access network. The first scheduling function determines that expanded coverage is needed for an uplink transmission for the second active wireless connection and obtains uplink scheduling information for the second active wireless connection. The first scheduling function adjusts uplink scheduling for the first active wireless connection such that power sharing is prioritized for uplink time intervals of the second active wireless connection over overlapping uplink time intervals of the first active wireless connection.

20 Claims, 9 Drawing Sheets

(56) References Cited

U.S. PATENT DOCUMENTS

| | | | | |
|---|---|---|---|---|
| 2019/0074876 | A1 | 3/2019 | Kakishima et al. | |
| 2020/0153972 | A1* | 5/2020 | Leung | H04L 65/70 |
| 2020/0162211 | A1 | 5/2020 | Wang et al. | |
| 2020/0187186 | A1* | 6/2020 | Li | H04W 76/11 |
| 2020/0413290 | A1* | 12/2020 | Yang | H04L 47/83 |
| 2021/0045174 | A1 | 2/2021 | Choi et al. | |
| 2021/0127340 | A1 | 4/2021 | Patel et al. | |
| 2021/0258894 | A1* | 8/2021 | Yao | H04W 72/23 |
| 2021/0274506 | A1* | 9/2021 | Raghavan | H04J 11/003 |
| 2022/0167457 | A1* | 5/2022 | Bhatoolaul | H04W 76/27 |
| 2022/0271883 | A1 | 8/2022 | Bin Sediq et al. | |
| 2022/0360608 | A1* | 11/2022 | Raleigh | H04L 47/2408 |
| 2023/0031065 | A1* | 2/2023 | Manolakos | H04W 64/00 |
| 2023/0180301 | A1* | 6/2023 | Seidel | H04W 74/006<br>370/329 |
| 2024/0214926 | A1* | 6/2024 | Karaki | H04W 52/0206 |

* cited by examiner

SYSTEMS AND METHODS FOR NEW-RADIO-AWARE LTE SCHEDULING

CROSS-REFERENCE TO RELATED APPLICATION

This application is a continuation of U.S. patent application Ser. No. 17/475,432, filed on Sep. 15, 2021, and titled "Systems and Methods for New-Radio-Aware LTE Scheduling," the contents of which are incorporated herein by reference.

BACKGROUND

Long Term Evolution (LTE) is a mobile telecommunications standard for wireless communications involving mobile user equipment, such as mobile devices and data terminals. LTE networks include existing Fourth Generation (4G) and 4.5 Generation (4.5G) wireless networks. Next Generation mobile networks, such as Fifth Generation (5G) mobile networks, are being implemented as the next stage networks in the evolution of mobile wireless networks. 5G networks may use different frequencies, different radio access technologies, and different core network functions than legacy wireless networks (e.g., LTE networks). While 5G networks are being deployed, 5G-capable UE devices need to be supported in legacy networks, such as LTE networks.

DETAILED DESCRIPTION OF EXAMPLE EMBODIMENTS

Figure 1:
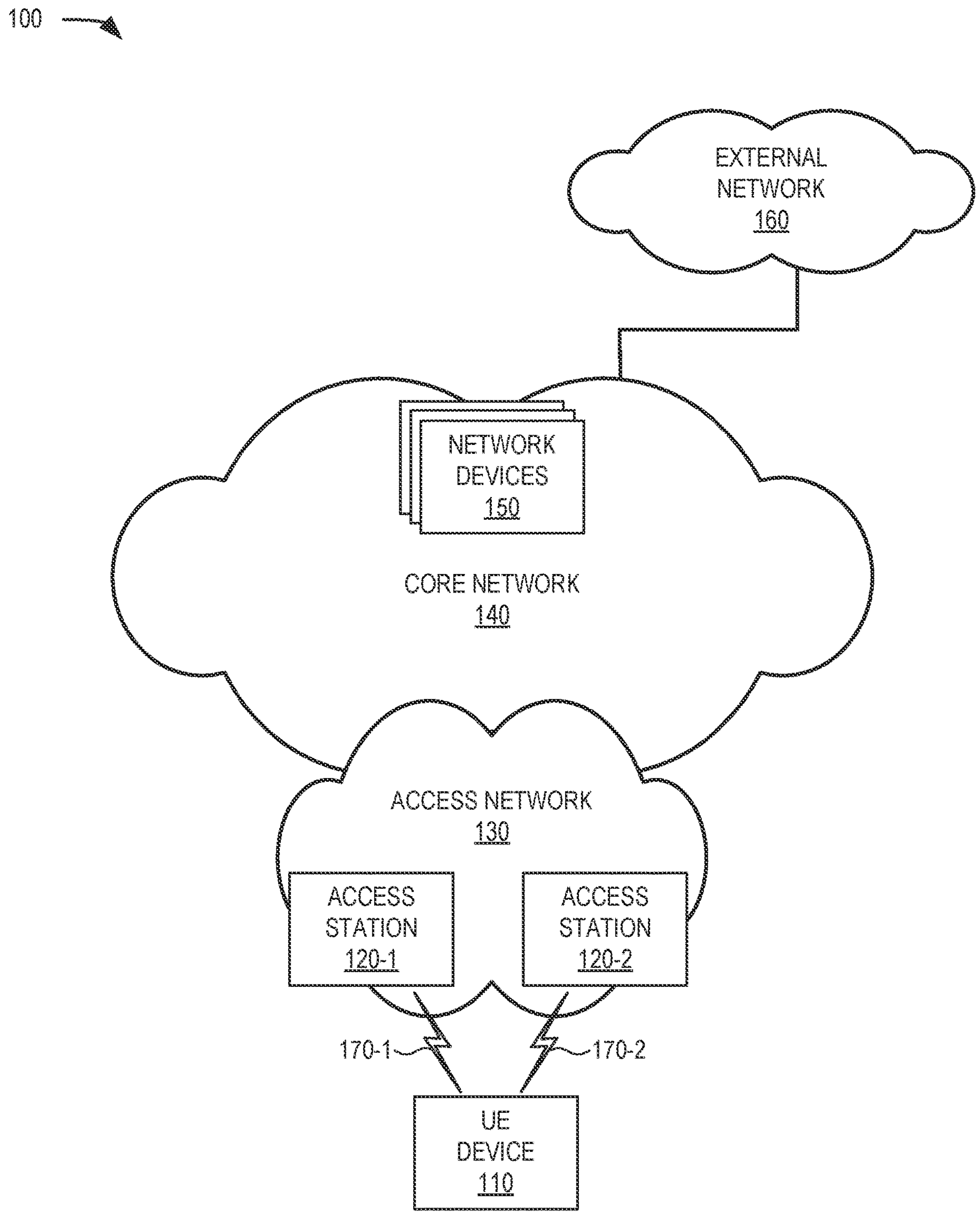
FIG. 1 is a diagram illustrating an example network environment in which systems and methods described herein may be implemented.

The following detailed description refers to the accompanying drawings. The same reference numbers in different drawings may identify the same or similar elements.

Fifth Generation (5G) New Radio (NR) networks may provide standalone (SA) and non-standalone (NSA) configurations. For an NSA configuration, a Long Term Evolution (LTE) Evolved Packet Core (EPC) may be used together with other components of a 5G network. For NSA service, an LTE cell (e.g., using one frequency/channel) may be an anchor cell that provides all control signals and some data, and a NR cell (using a different frequency/channel) may be used for a secondary cell that provides additional data service. Initial 5G deployments are utilizing the NSA mode to take advantage of existing infrastructure and more expansive cell coverage of LTE networks, while providing access to higher bandwidths available through NR connections.

In NSA mode, a user equipment (UE) device's transmit power is shared between LTE and NR channels. Particularly, during simultaneous transmission of uplink (UL) traffic sent over both LTE and NR, the UE device's available transmit power is shared between the LTE channel and NR channel. Thus, the UE device does not apply full transmit power to either of the channels during simultaneous transmission of UL traffic. Reduced power can adversely affect NR UL transmission and may provide a poor customer experience. Conversely, increasing NR UL transmit power can improve the coverage area of a NR connection and enable better NR connectivity. Thus, there is a need to ensure shared transmit power for a UE device is optimized to support a NR connection during dual LTE-NR connectivity.

Systems and methods described herein provide improved NR session performance through coordinated scheduling of LTE and NR UL Transmission Time Intervals (TTIs). More particularly, a radio access network (RAN) may direct scheduling for UE devices to avoid LTE physical uplink shared channel (PUSCH) scheduling on LTE time intervals (i.e., resource elements or blocks) coincident with NR UL time intervals. According to an implementation, an access station for a RAN includes a first scheduling function (e.g., an LTE scheduler). The first scheduling function identifies a UE device that has a first active wireless connection and a second active wireless connection in the RAN. The first scheduling function determines that expanded coverage is needed for uplink signals for the second active wireless connection and obtains, from a second scheduling function (e.g., an NR scheduler) or from provisioned data, uplink scheduling information for the second active wireless connection. The first scheduling function adjusts uplink scheduling for the first active wireless connection to prioritize power sharing for uplink time intervals of the second active wireless connection over overlapping uplink time intervals of the first active wireless connection.

In the description below, implementations are described primarily in the context of coordinated TTI scheduling for dual connectivity with active LTE and NR connections. However, in other implementations, the systems and methods described herein may be applicable to other dual connections where a one active wireless connection uses a relatively low frequency band and another active wireless connection uses a higher frequency band. For example, the systems and methods described herein may also be used to optimize dual connectivity for two NR connections using different frequency bands (e.g., NR-DC).

FIG. 1 is a diagram of an example environment 100 in which the systems and/or methods described herein may be implemented. As shown in FIG. 1, environment 100 may include a UE device 110, a RAN 130 including an access station 120-1 for one type of Radio Access Technology (RAT) type and an access station 120-2 for a different RAT type, a core network 140 with network devices 150, and an external network 160. Access stations 120-1 and 120-2 may be referred to herein collectively as access stations 120 and generically as access station 120. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

In the configuration of FIG. 1, UE device 110 may use wireless channels 170-1 and 170-2 (referred to collectively as wireless channels 170) to communicate with access stations 120-1 and 120-2, respectively. Wireless channels 170 may correspond, for example, to physical layer protocols in accordance with different radio access technology (RAT) types. For example, wireless channel 170-1 may correspond to the physical layer according to 4G or 4.5G RAN standards (e.g., 3GPP standards for 4G and 4.5G air interfaces, collectively referred to herein as "LTE"), while wireless channel 170-2 may correspond to the physical layer according to 5G NR standards (e.g., 3GPP standards for 5G air interfaces). As described further herein, wireless channels 170 may be used to provide communications to/from UE device 110 using a dual-connectivity.

UE device 110 may include any type of mobile device having multiple coverage mode capabilities, and thus communicate simultaneously using different wireless channels (e.g., channels 170). UE device 110 may be a mobile device that may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or another device that includes cellular communication capabilities. In other implementation, UE device 110 may be implemented as a machine-type communications (MTC) device, an Internet of Things (IoT) device, a machine-to-machine (M2M) device, etc. According to implementations described herein, UE device 110 may be provisioned (e.g., via a subscriber identity module (SIM) card or another secure element) to recognize particular network identifiers (e.g., associated with RANs 130) and to support particular RF spectrum ranges. Additionally, UE device 110 may support simultaneous connections of different RAT types (e.g., LTE and 5G NR).

Access station 120 may include a transceiver system that connects UE device 110 to other components of RAN 130 and core network 140 using wireless/wired interfaces. Access station 120 may be implemented as a base station (BS), a base transceiver station (BTS), a Node B, an evolved Node B (eNB or eNodeB), an evolved LTE (eLTE) eNB, a next generation Node B (gNB or gNodeB), a remote radio head (RRH), an RRH and a baseband unit (BBU), a BBU, or other type of wireless node (e.g., a picocell node, a femtocell node, a microcell node, etc.) that provides wireless access to one of RANs 130. According to an implementation, access stations 120 may include a gNB with multiple distributed components, such as a central unit (CU), a distributed unit (DU), a remote unit (RU or a remote radio unit (RRU)), or another type of distributed arrangement. Each access station 120 typically uses multiple carrier frequencies in a single instance. For example, a single access station 120 may provide coverage over an area referred to as a cell. Access stations 120 may support RANs 130 having different RAT-types. For example, in one implementation, RAN 130 may include an Evolved Universal Mobile Telecommunications System (UMTS) Terrestrial Radio Access Network for an LTE network and a 5G NR RAN.

According to an exemplary embodiment, one or more of access stations 120 may include logic to coordinate scheduling of LTE and NR UL time intervals for a UE device 110. The coordinated scheduling logic may determine that expanded coverage is needed for an NR connection and maximize available power for NR UL transmissions. For example, an NR scheduler in an access station 120 may communicate with an LTE scheduler in the same or different access station 120 to avoid LTE PUSCH scheduling on LTE time intervals coincident with NR UL time intervals.

Core network 140 may include one or multiple networks of one or multiple types. For example, core network 140 may be implemented to include a terrestrial network and/or a satellite network. According to an exemplary implementation, core network 140 includes a network may interact with multiple types of RANs 130. For example, core network 140 may include the core part of an LTE network, an LTE-A network, a 5G network, a legacy network, and so forth.

Depending on the implementation, core network 140 may include various network elements that may be implemented in network devices 150. Network devices 150 may include physical function nodes or virtual network functions (VNFs). Thus, the components of core network 140 may be implemented as dedicated hardware components and/or as VNFs implemented on top of a commonly shared physical infrastructure using, for example, Software Defined Networking (SDN). Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140. In some implementations, one or network devices 150 may provide information to access stations 120 to facilitate coordinated scheduling of LTE and NR UL time intervals.

External network 160 may include one or more networks, such as a local area network (LAN), a wide area network (WAN), a metropolitan area network (MAN), a telephone network, the Internet, etc., capable of communicating with UE devices 110. In one implementation, external network 160 includes a network that provides data services (e.g., via packets or any other Internet protocol (IP) datagrams) to UE device 110.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
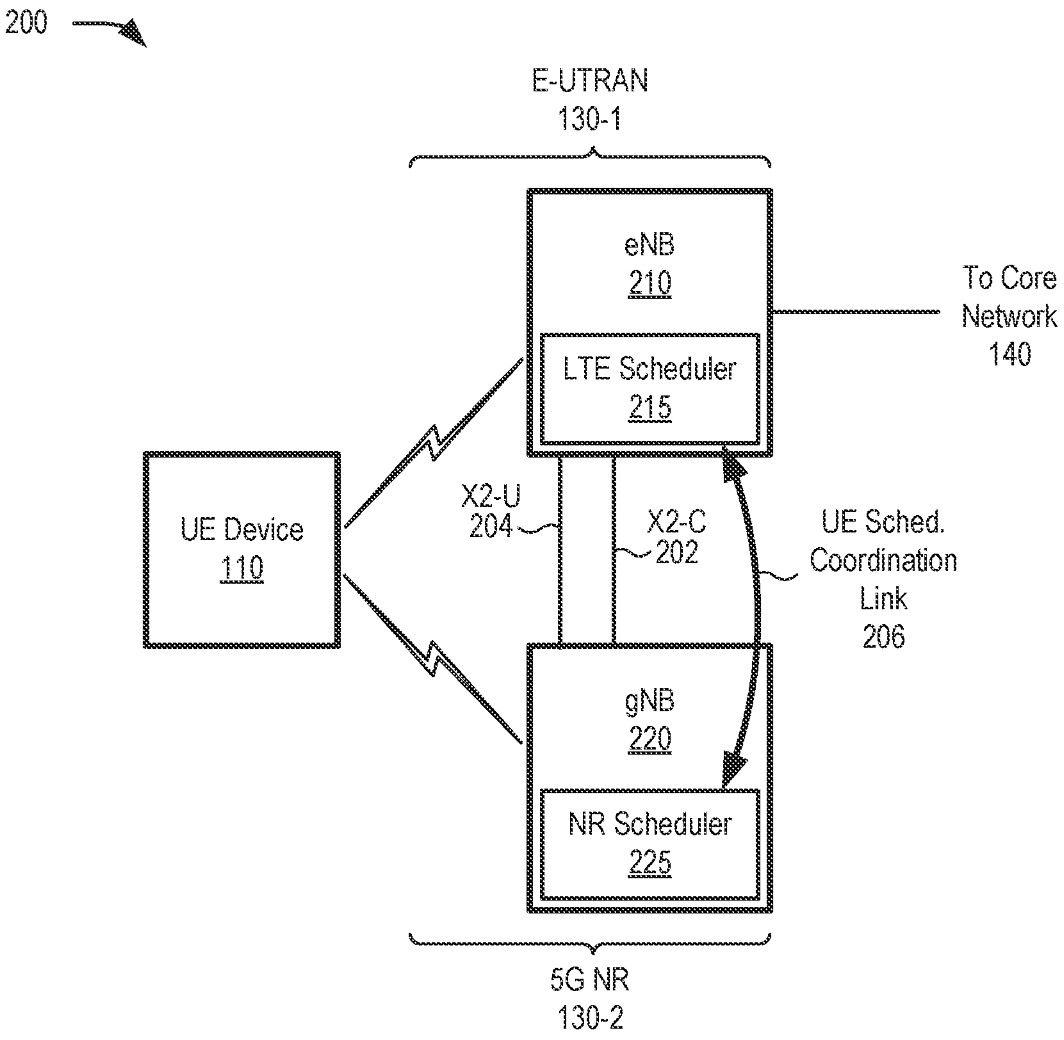
FIG. 2 is a diagram illustrating connections among devices in a portion of a radio access network (RAN)

FIG. 2 is a diagram illustrating connections among devices in a portion 200 of network environment 100. In the configuration of FIG. 2, RAN 130 provides dual connectivity capability to UE device 110 using E-UTRAN 130-1 and 5G NR RAN 130-2. Access stations 120-1 and 120-2 for RANs 130-1 and 130-2 may be implemented as eNB 210 and gNB 220, respectively. eNB 210 may include an LTE scheduler 215 and other components that allow end device 110 to wirelessly connect to LTE RAN 130-1. gNB 220 may include a NR scheduler 225 and other components that allow end device 110 to wirelessly connect to 5G NR RAN 130-2.

Radio frequency bands for LTE are generally assigned to lower frequency bands on the available radio spectrum. Radio frequency bands for 5G NR may vary. A 5G network may include certain categories of radio frequency bands, such as those above 6 GHz and below 6 GHz, as well as other band with different names or labels, such as sub-3 (e.g., below 3 GHz), mid-band (e.g., between 3 GHz and 6 GHz), low band, millimeter wave (mmWave), and so forth. Regardless of the nomenclatures or categories, using higher frequency bands typically incurs larger propagation loss as compared to lower frequency bands. In addition, uplink (UL) and downlink (DL) coverage areas at mid-band frequencies may be significantly different. For example, an UL coverage area may be smaller than a DL coverage area due to transmit power and receiver capability differences (e.g., antenna array, noise figure, etc.) between a UE device 110 and an access station 120.

In the example configuration of FIG. 2, eNB 210 serves as a "master" node, while gNB 220 serves as a secondary node. eNB 210 and gNB 220 may communicate with each other via an X2 interface. An X2 interface may be implemented, for example, with a protocol stack that includes an X2 application protocol and Stream Control Transmission Protocol (SCTP). As shown in FIG. 2, X2 interface may be divided into a control plane interface, X2-C 202, and a user plane interface, X2-U 204. X2-C 202 interface may be used to coordinate uplink and downlink traffic scheduling for end device 110. X2-U 204 interface may be used to route data packets for end device 110 between eNB 210 and gNB 220. According to another implementation, eNB 210 and gNB 220 may be co-located in a single unit and use a dedicated UE schedule coordination link 206 or backplane to exchange information.

LTE scheduler 215 and NR scheduler 225 may schedule use of resources (e.g., resource blocks in a physical layer) to optimize delivery of UL traffic from UE devices 110. According to one implementation, for example, LTE scheduler 215 and NR scheduler 225 may use link 206 to exchange information for particular UE devices 110 to coordinate scheduling of LTE and NR UL time intervals for a UE device 110. According to another implementation, LTE scheduler 215 may be provisioned with known scheduling patterns used by NR scheduler 225 to enable LTE scheduler 215 to coordinate scheduling of LTE and NR UL time intervals. In still another implementation, NR scheduler 225 may use X2-C interface 202 to provide the known scheduling patterns used by NR scheduler 225.

According to one implementation, NR scheduler 225 may provide to LTE scheduler 215 an indication of potential poor coverage for a NR connection. According to an implementation, poor coverage may be implied or derived based on past signal measurements by other UEs or based on known signal propagation models. For example, gNB 220 may identify poor coverage based on reports from UE device 110, such as signal quality measurement information that is below a particular quality threshold. When signal quality for a NR connection is below a preset threshold, NR scheduler 225 may provide signal quality measurement information to LTE scheduler 215. For example, the signal quality measurement information may include a signal-to-interference-plus-noise ratio (SINR) value. In other implementations, the signal quality measurement information may include a reference signal receive power (RSRP) value, a received signal strength indicator (RSSI), a reference signal received quality (RSRQ) value, a signal-to-noise ratio (SNR), a channel quality indicator (CQI), or another type of channel condition value. In another implementation, NR scheduler 225 may simply provide to LTE scheduler 215 an indication of a poor NR coverage based on, for example, the quality measurement information falling below the preset threshold (e.g., −5 dB SINR, −4.5 dB SINR, etc.).

In addition to quality measurement information and/or a NR signal strength indication, NR scheduler 225 may also provide NR scheduling information to LTE scheduler 215, if LTE scheduler 215 has not be otherwise provisioned with known NR scheduling information. For example, NR scheduler 225 may provide an indication of what Transmission Time Intervals (TTIs) are assigned for NR UL channels. According to an implementation, NR scheduler 225 may provide quality measurement information only when poor NR coverage is identified or projected. For example, an UL SINR below −5 dB may be designated as a threshold indicating poor coverage. If gNB 220 determines that UE device 110 has (or is projected to have) a UL SINR below −5 dB, NR scheduler 225 may provide NR scheduling information to LTE scheduler 215. In another implementation, NR scheduler 225 may continuously provide quality measurement information to LTE scheduler 215 for an active UE 110 session.

LTE scheduler 215 may include logic to receive a NR signal strength indication and/or scheduling information from NR scheduler 225 for a particular UE device 110. In response to a poor NR signal strength indication from NR scheduler 225, LTE scheduler 215 may identify overlapping UL slots on the LTE and NR carriers and adjust LTE UL scheduling (e.g., LTE PUSCH scheduling) to avoid or minimize LTE UL power consumption by UE device 110 during use of NR UL time intervals. According to an implementation where LTE scheduler 215 is provisioned with NR TDD pattern information ahead of time, LTE scheduler 215 may use radio frame boundaries to align corresponding NR and LTE schedules and detect overlapping UL time slots that can be targeted for UE power conservation. This UE power conservation strategy is described further below in connection with FIGS. 3A-3C, 4A, 4B, and 5.

Although FIG. 2 shows example components of network portion 200, in other implementations, network portion 200 may contain fewer components, different components, differently-arranged components, or additional components than depicted in FIG. 2. For example, in another implementation, eNB 210 and gNB 220 may be combined in a single access station 120.

Figure 3A:
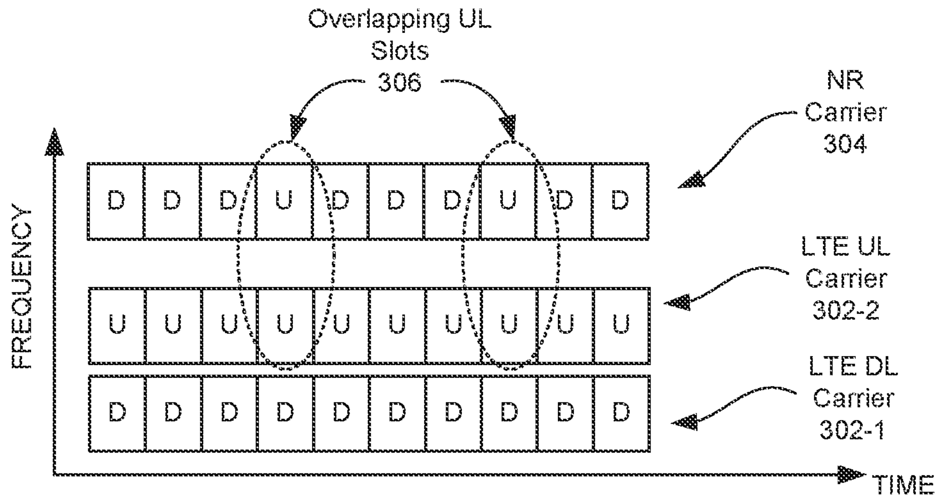
FIGS. 3A-3C are examples of Frequency Division Duplex (FDD) and Time Division Duplex (TDD) communication links between a UE device and an access station.
Figure 3B:
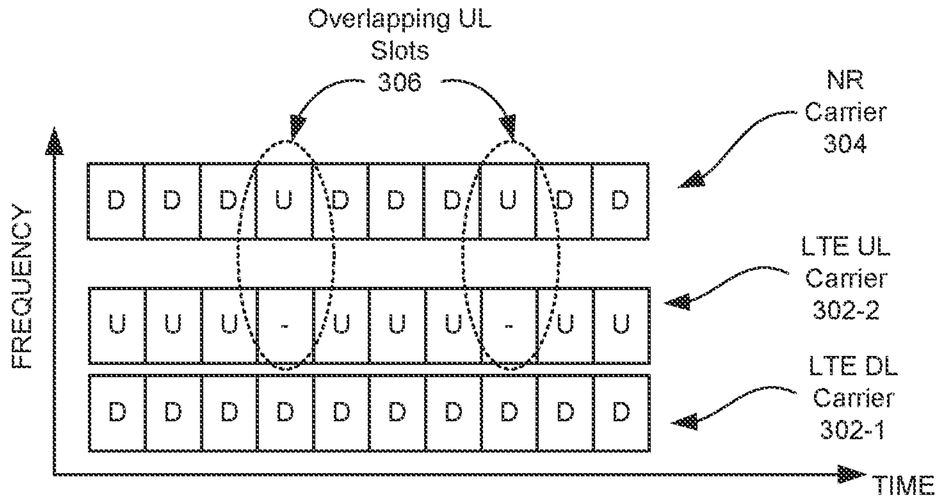
Figure 3C:
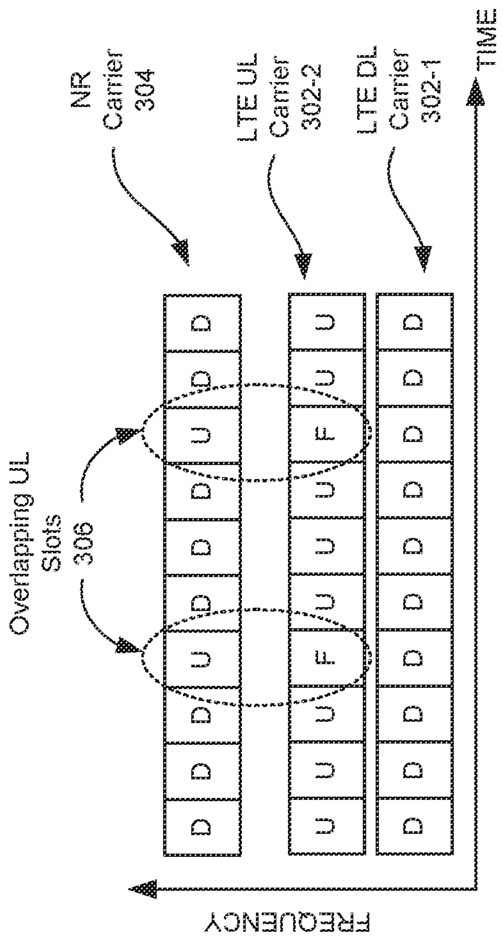

FIGS. 3A-3C illustrate examples of Frequency Division Duplex (FDD) and Time Division Duplex (TDD) communication links for active wireless connections between UE device 110 and access station(s) 120. As shown in FIG. 3A, a first FDD link between UE device 110 and access station 120 may use a carrier 302-1 for downlink transmissions at a first frequency band (e.g., a frequency designated to support downlink LTE channel). A second FDD link between UE device 110 and access station 120 may be used as a carrier 302-2 for uplink transmissions at a different frequency band (e.g., a frequency designated to support uplink LTE channel). Each of carriers 302-1 and 302-2 may use a sequence of slots over a number of time intervals. Each time interval, which a single slot may occupy, is marked "D" or "U" to indicate whether the slot carries an uplink or downlink signal/data. Although slots are shown with the same time duration in FIGS. 3A-3C, in other implementations, slot durations may vary within a carrier or between carriers.

Still referring to FIG. 3A, a TDD link may operate to use NR carrier 304 at a different frequency band (e.g., spectrum designated to support 5G-NR channels) than carriers 302-1 and 302-2. Carrier 304 may use TDD to transmit both uplink and downlink symbols. In contrast to the symbols in FDD downlink carrier 302-1 and uplink carrier 302-2, which occupy two different frequency bands, the uplink and downlink slots in carrier 304 are interleaved and at a single frequency band. That is, each of UE device 110 and access station 120 alternate in sending downlink transmissions or uplink transmissions at specific times in accordance with one of multiple, predefined timing patterns.

For example, assume that UE device 110 receives FDD format instructions from LTE scheduler 215. The instructions from LTE scheduler 215 may designate an uplink format for LTE UL carrier 302-2. Assume that UE device 110 also receives TDD format instructions from NR scheduler 225. The instructions from NR scheduler 225 may indicate the symbol pattern "U U U D U U U D U U" for NR carrier 304. Using this pattern, UE device 110 and NR scheduler 225 may schedule their data transmissions. In accordance with the pattern, access station 120 (e.g., gNB 220) may first transmit over three slots; UE device 110 may transmit using the fourth slot; access station 120 may then transmit using the next three slots (fifth through seventh); UE device 110 may again transmit using its slot (eighth slot); and so forth. In the arrangement of FIG. 3A, UE device 110 may share transmit power between channels 302-2 and 304 when transmitting during overlapping UL slots 306 (e.g., the time intervals for which LTE UL data is scheduled for transmission at the same time as NR UL data).

Referring to FIG. 3B, LTE scheduler 215 and NR scheduler 225 may coordinate UL scheduling to prioritize NR delivery. In the arrangement of FIG. 3B, UE device 110 may skip potentially overlapping slots for UL symbols in LTE UL carrier 302-2. Thus, UE device 110 would not need to share transmit power between channels 302-2 and 304 during the overlapping slots 306. By avoiding LTE PUSCH scheduling on overlapping NR UL slots, UE device 110 may provide up to 3 dB of additional power available for NR UL transmissions on NR channel 302-2, which can improve NR coverage and performance. Such improved performance may be especially noticeable when higher band (e.g., C-band) carriers are used for NR carriers.

Figure 4A:
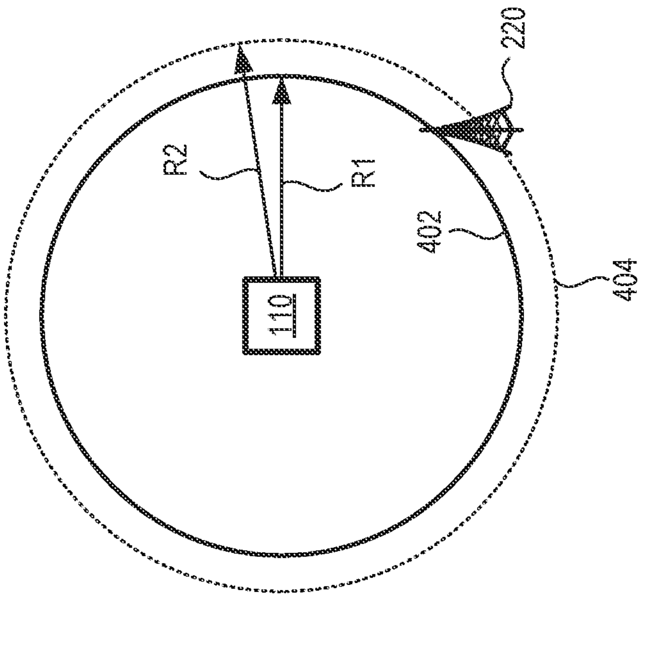
FIGS. 4A and 4B are illustrations of expanded New Radio (NR) coverage for different UE devices.
Figure 4B:
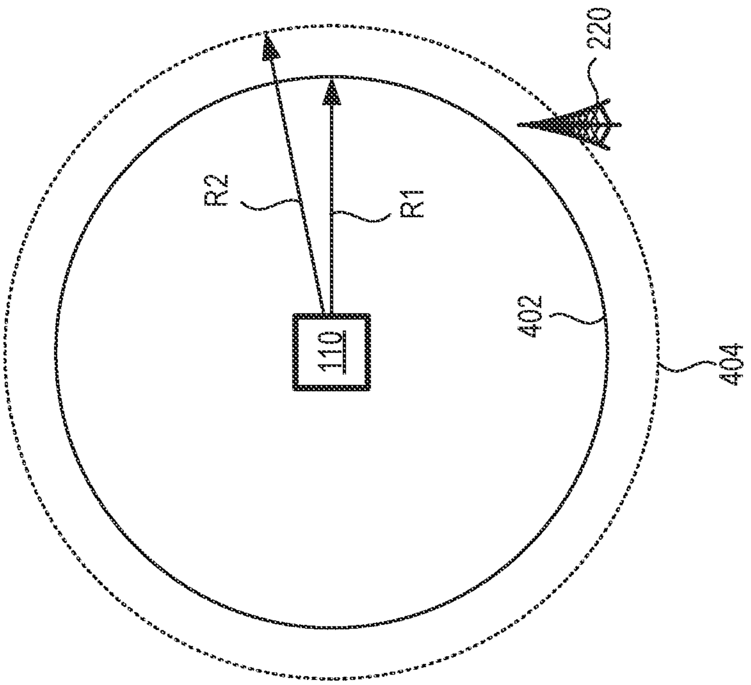

FIGS. 4A and 4B provide an illustration of extended NR coverage for different power class UE devices using C-band carriers. As shown in FIG. 4A, a power class 3 (PC3) UE device is typically rated for up to 20 dBm, which may provide an UL cell radius (R1) of about 440 meters. According to implementations described herein, by eliminating power sharing for LTE and NR UL channels, PC3 type UE devices can have power levels of up to 23 dBm available for NR UL channels. Thus, for PC3 devices, the projected cell radius (R2) increases to about 510 meters. The resulting NR coverage footprint 404 has potential to increase by almost 34 percent over the original footprint 402 depending on local propagation conditions.

Similarly, as shown in FIG. 4B, a power class 2 (PC2) UE device is typically rated for up to 23 dBm, which may provide an UL cell radius (R1) of about 510 meters. According to implementations described herein, by eliminating power sharing for LTE and NR UL channels, PC2 type UE devices can have power levels of up to 26 dBm available for NR UL channels. Thus, for PC2 devices, the projected cell radius (R2) increases to about 600 meters. The resulting NR coverage footprint 404 has potential to increase by almost 38 percent over the original footprint 402 depending on local propagation conditions.

UE power conservation attained through optimal scheduling of LTE PUSCH can benefit NR mid-band coverage and performance significantly. However, preventing LTE scheduling on particular slots and frequency ranges (i.e., resource elements) aligned to NR UL (e.g., overlapping UL slots on channel 304) can reduce throughput on the LTE carrier. Thus, according to another implementation described in connection with FIG. 3C, LTE scheduler 215 and NR scheduler 225 may share traffic and loading information to provide optimized LTE and NR channel/power utilization.

Referring to FIG. 3C, LTE scheduler 215 and NR scheduler 225 may coordinate UL scheduling to optimize NR and LTE symbol delivery. In the arrangement of FIG. 3C, each of the potentially overlapping UL slots 306 in LTE UL carrier 302-2 may be designated as a flexible slot or a symbol (indicated with an "F"), where the flexible symbols may indicate no symbol, a reduced-power symbol, or a typical UL symbol may be used.

According to an implementation, such as illustrated in FIG. 3C, LTE scheduler 215 may permit UE device 110 to utilize unused overlapping transmission slots 306 for symbol transmission. For example, when there is no NR symbols in channel 304 scheduled for the overlapping slots 306 (on the LTE and NR channels), LTE scheduler 215 may utilize optimized overlapping UL slots 306 on LTE channel 302-2, instead of leaving them unused (for users who do not have scheduled NR UL transmissions on NR channel 304). For example, NR scheduler 225 may provide updated NR load data for UE 110 to LTE scheduler 215 via the X2-C 202 interface.

According to another implementation in the scenario illustrated in FIG. 3C, when there is a concurrent NR transmission and LTE transmission with overlapping slots 306, based on radio conditions on the NR side, LTE scheduler 215 may permit use of LTE channel 302-2 at a lower power and/or a more robust uplink modulation and coding scheme (MCS) assignment for the same user device 110. In this implementation, the UL transmission scheme will still favor the NR UL transmission, but not shut down LTE UL transmission altogether for user device 110. For example, FIG. 5 provides an illustration of NR coverage improvements that can be achieved according to an implementation.

Figure 5:
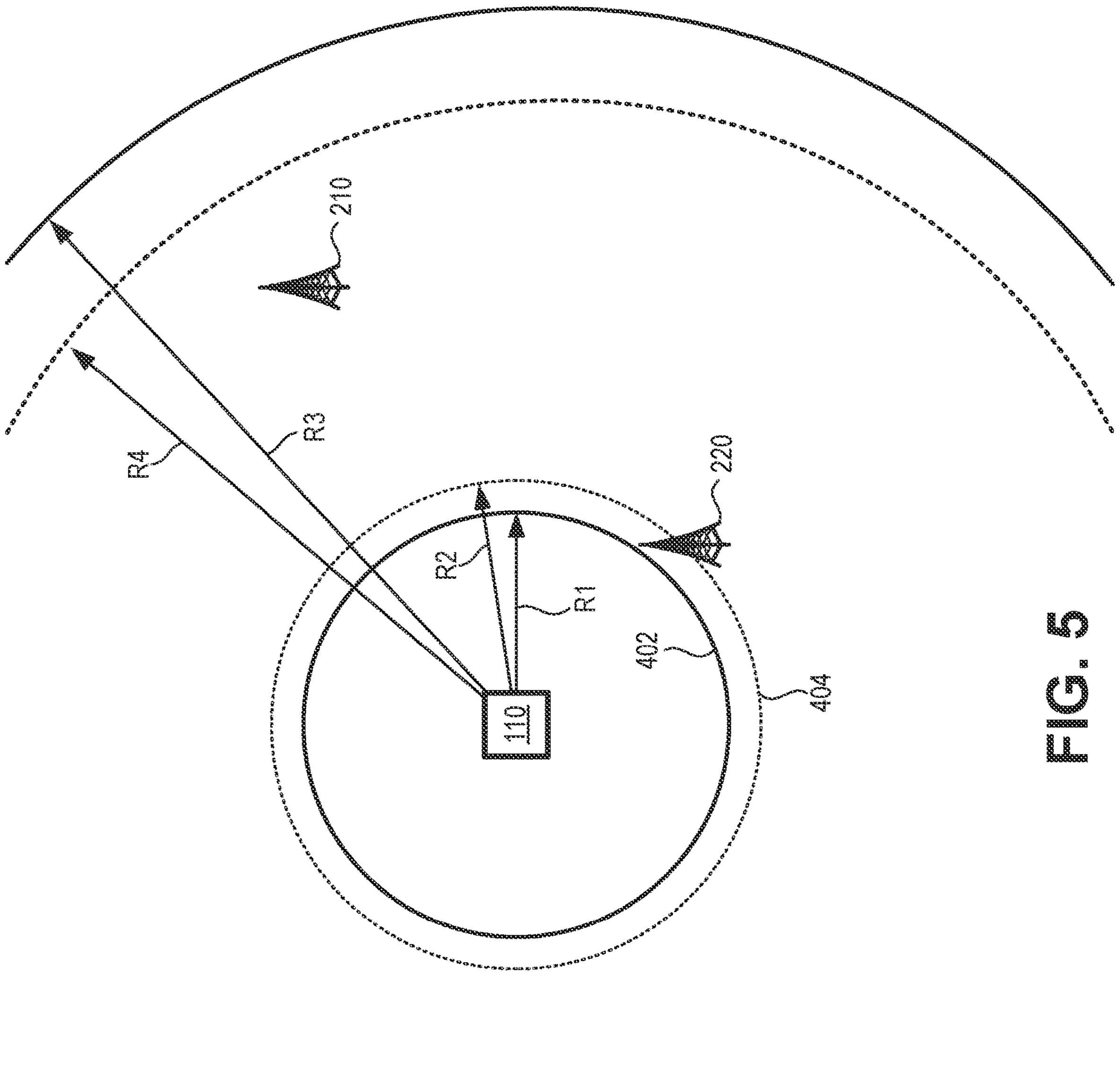
FIG. 5 is a diagram illustrating expanded NR coverage that can be achieved according to an implementation.

As shown in FIG. 5, a typical power transmit sharing arrangement may provide an UL NR cell radius (R1) and an UL LTE cell radius (R3). According to implementations described herein, LTE scheduler 215 may adjust a transmit power split ratio to favor NR UL channels over LTE UL channels. By reducing shared transmit power levels for overlapping UL LTE slots 306 (in channel 302-2) and increasing shared transmit power levels for overlapping UL NR slots 306 (in channel 304), UE device 110 may optimize NR coverage while maintaining effective LTE coverage. The adjusted transmit power levels may provide an UL NR cell radius (R2) and an UL LTE cell radius (R4). According to an implementation, the shared power ratio between LTE and NR may be adjusted so that only when conditions are very poor on the NR side, would all available UL transmit power from channels 302-2 be allocated to the NR carrier 304 for the user. Lower/more robust MCS can be implemented for LTE channels when power is lowered on LTE channel 302-2 under concurrent transmission scenarios.

Figure 6:
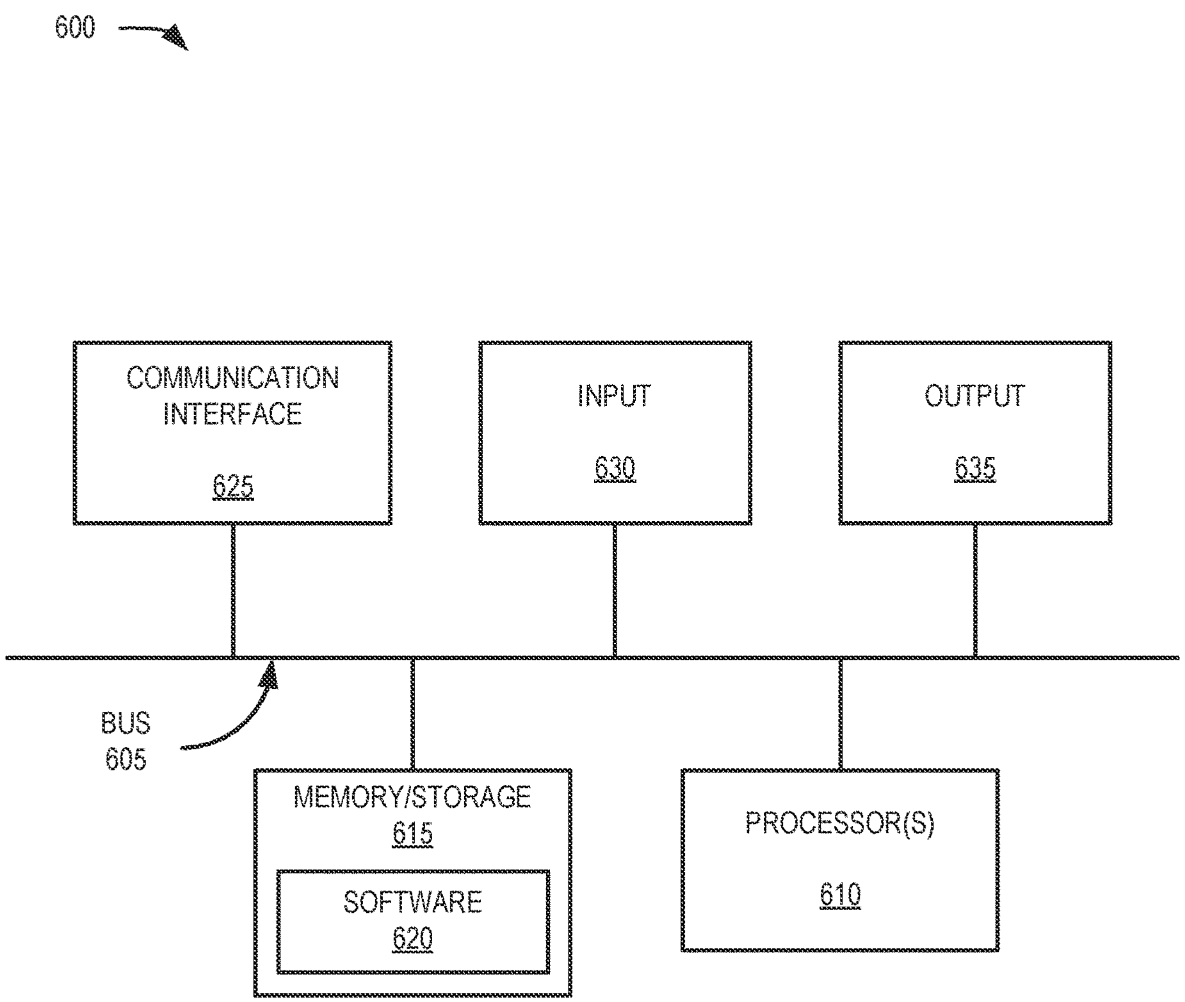
FIG. 6 is a diagram illustrating example components of a device that may correspond to one or more of the devices described herein.

FIG. 6 is a diagram illustrating example components of a device 600 that may be included in one or more of the devices described herein. For example, device 600 may correspond to UE device 110, access station 120, network device 150, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to LTE scheduler 215, software 620 may include an application that, when executed by processor 610, provides a function and/or a process to limit/avoid LTE PUSCH scheduling on LTE slots coincident with NR UL slots, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, software components may be instantiated, created, deleted on device 600, or be placed in some operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., access network 130) and/or another type of network (e.g., core network 140, external network 160, etc.). Thus, network devices described herein may be implemented as device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 may cause processor 610 to perform a function or a process described herein. Alternatively, for example, according to other implementations, device 600 performs a function or a process described herein based on the execution of hardware (processor 610, etc.).

Figure 7:
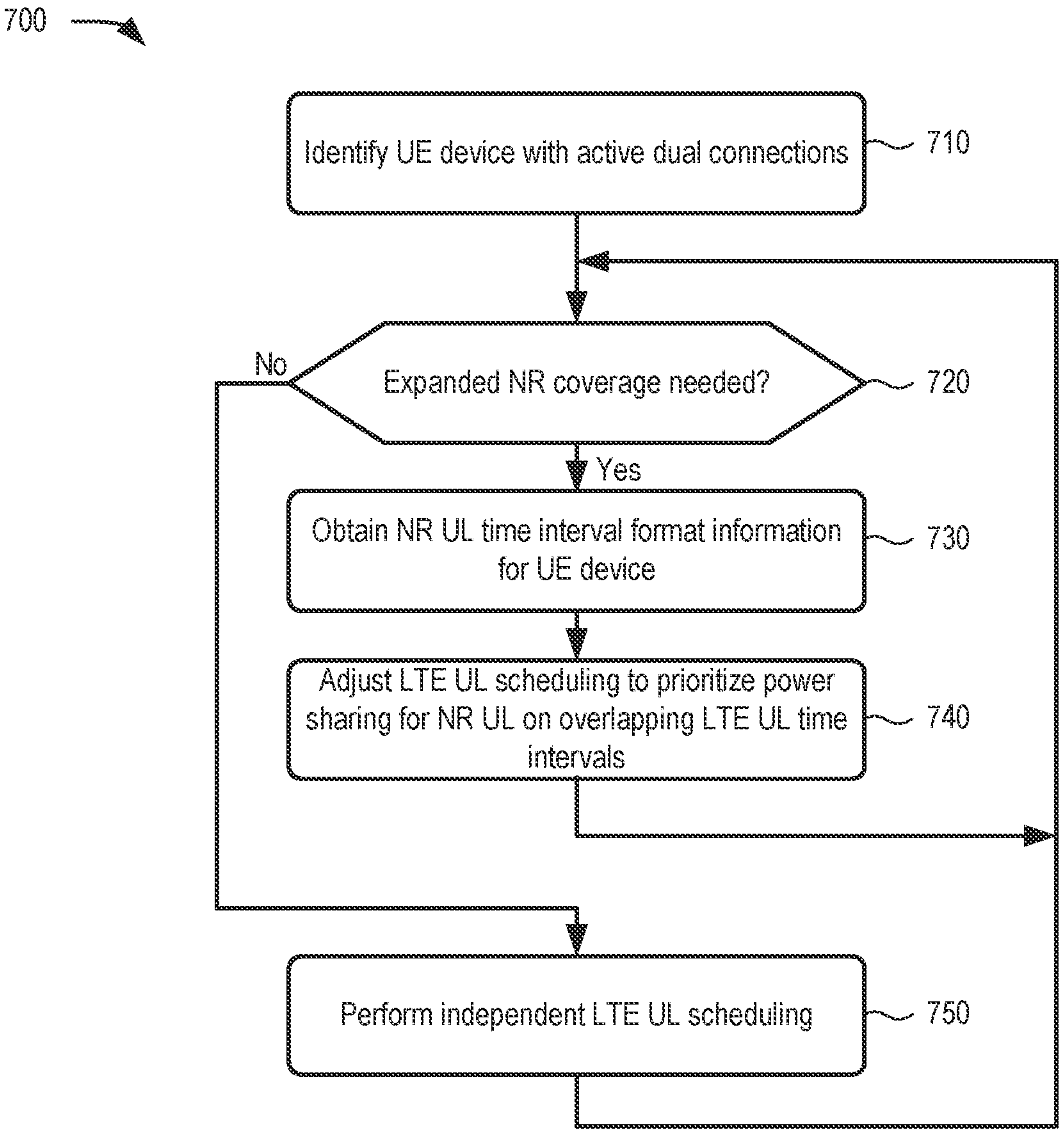
FIGS. 7 and 8 are flow diagrams illustrating an example process for performing NR-aware LTE uplink scheduling, according to an implementation described herein.

FIG. 7 is a flow diagram illustrating an example process 700 for performing NR-aware LTE uplink scheduling, according to an implementation described herein. In one implementation, process 700 may be implemented by eNodeB 210. In another implementation, process 700 may be implemented by eNodeB 210 in conjunction with one or more other devices in network environment 100.

Process 700 may include identifying a UE device with dual connectivity (block 710) and determining if expanded NR coverage is needed for uplink transmissions of the UE device (block 720). For example, a UE device 110 may connect to RAN 130 where eNB 210 serves as a master node and gNB 220 serves as a secondary node. Using X2-C interface 202, NR scheduler 225 may provide to LTE scheduler 215 an indication of potential poor coverage for the NR connection.

If expanded NR coverage is needed for the UE (block 720—Yes), process 700 may include obtaining NR scheduling information for the UE device (block 730), and adjusting LTE UL scheduling for the UE to prioritize power sharing for NR UL channels on overlapping LTE UL slots (block 740). For example, if LTE scheduler 215 has been previously provisioned with NR scheduling information, LTE scheduler may retrieve relevant scheduling information that is applicable to UE device 110. Alternatively, NR scheduler 225 may provide to LTE scheduler 215 NR scheduling information via link 206. In response, LTE scheduler 215 may adjust LTE UL scheduling (e.g., LTE PUSCH scheduling) such that power sharing is prioritized for NR UL slots over overlapping LTE UL slots. For example, LTE scheduler 215 may avoid or minimize LTE UL power consumption by UE device 110 during use of NR UL slots for transmission. For example, LTE scheduler 215 may simply skip scheduling LTE UL symbols on all overlapping NR UL slots, or LTE scheduler 215 may implement more flexible solutions based on information from gNB 220/NR scheduler 225. LTE scheduler 215 may continue to adjust the LTE UL scheduling until gNB 220 provides an update for NR coverage conditions.

If expanded NR coverage is not needed for the UE (block 720—No), process 700 may include performing independent LTE UL scheduling (block 750). For example, if NR scheduler 225 fails to provide a poor NR signal indication, LTE scheduler 215 may continue with LTE scheduling that is independent of NR scheduling. LTE scheduler 215 may continue to perform independent LTE UL scheduling unless/until gNB 220 provides an indication that expanded coverage is needed.

Figure 8:
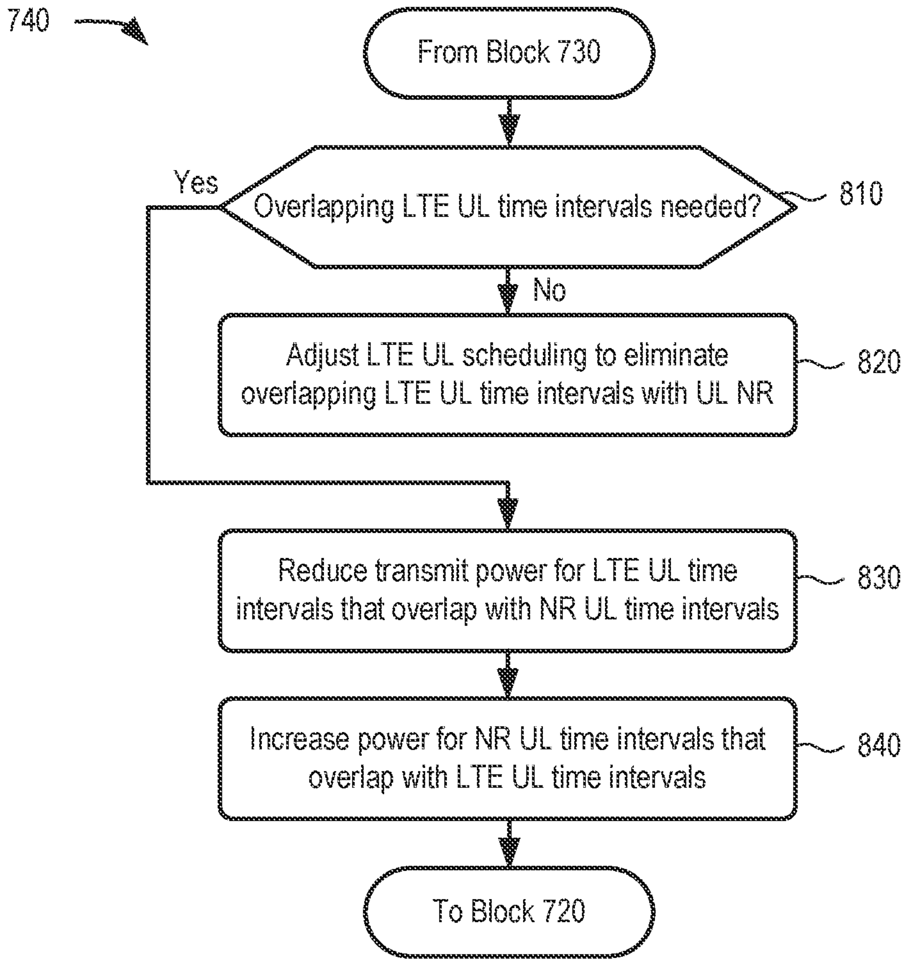

According to one implementation, process block 740 may include process blocks described in FIG. 8. A shown in FIG. 8, process block 740 may include determining if the overlapping LTE UL slots are needed to provide required service levels (block 810). For example, eNB 210/LTE scheduler 215 may monitor LTE UL bandwidth demands and/or LTE UL signal quality (e.g., based on SINR or other values) to determine if use of overlapping LTE UL slots for symbols transmission is needed.

If the overlapping LTE UL slots for carrying symbols are not needed (block 810—No), process block 740 may include adjusting the LTE UL scheduling to eliminate use of overlapping LTE UL slots (block 820). For example, if LTE UL bandwidth demands and LTE UL signal quality are adequate to meet required service levels, LTE scheduler 215 may prevent scheduling LTE UL symbols during overlapping slots with NR uplink signals.

If the overlapping LTE UL slots are needed (block 810—Yes), process block 740 may include reducing transmit power for the LTE UL slots that overlap with NR UL slots (block 830), and increasing transmit power for the NR UL slots that overlap with LTE UL intervals (block 840). For example, LTE scheduler 215 may adjust a transmit power split ratio to favor NR UL signals over LTE UL signals.

The foregoing description of implementations provides illustration and description, but is not intended to be exhaustive or to limit the invention to the precise form disclosed. Modifications and variations are possible in light of the above teachings or may be acquired from practice of the invention. For example, while FIGS. 3A-3C illustrate scenarios for dual connectivity, other arrangements of FDD and/or TDD communication links may be used. For instance, both LTE and NR may use TDD communication links. Also, while a series of blocks have been described with regard to FIGS. 7 and 8, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

identifying, by a first scheduling function of a radio access network, a User Equipment (UE) device that has a first active wireless session over the radio access network and a second active wireless session over the radio access network, wherein the first scheduling function schedules use of physical resources for a first Radio Access Technology (RAT) type for the first active wireless session for the UE device;

determining, by the first scheduling function and based on a signal from a second scheduling function of the radio access network, that expanded coverage is needed for an uplink transmission for the second active wireless session, wherein the second scheduling function schedules use of physical resources for a second RAT type for the second active wireless session for the UE device; and coordinating, by the first scheduling function and based on the determining, uplink scheduling for the first and second active wireless sessions to prioritize uplink signals for the second active wireless session at overlapping uplink time intervals for the first and second active wireless sessions.

2. The method of claim 1, wherein the coordinating causes the UE device to not share transmit power for the first active wireless session and the second active wireless session during the overlapping uplink time intervals.

3. The method of claim 1, wherein the coordinating causes the UE device to reduce transmit power for the first active wireless session, relative to the second active wireless session, during the overlapping uplink time intervals.

4. The method of claim 1, wherein the first scheduling function and the second scheduling function are included within a same access station.

5. The method of claim 1, wherein the coordinating includes:

exchanging scheduling information for the first and second active wireless sessions via a dedicated UE schedule coordination link.

6. The method of claim 1, wherein the coordinating includes:

retrieving, by the first scheduling function, scheduling patterns used by the second scheduling function for the second active wireless session.

7. The method of claim 1, wherein the determining includes:

receiving, from the second scheduling function, a signal quality measurement for the second active wireless session.

8. The method of claim 1, wherein the first active wireless session uses a Long-Term Evolution (LTE) connection on a first frequency band and wherein the second active wireless session uses a New Radio (NR) connection on a second frequency band that is different than the first frequency band.

9. The method of claim 1, wherein the coordinating includes:

eliminating physical uplink shared channel (PUSCH) scheduling on time intervals for the first active wireless session that are coincident with New Radio uplink time intervals for the second active wireless session.

10. A device comprising:

a processor configured to execute a first scheduling function to:

identify a User Equipment (UE) device that has a first active wireless session over a radio access network and a second active wireless session over the radio access network, wherein the first scheduling function schedules use of physical resources for a first Radio Access Technology (RAT) type for the first active wireless session for the UE device;

determine, based on a signal from a second scheduling function of the radio access network, that expanded coverage is needed for an uplink transmission for the second active wireless session, wherein the second scheduling function schedules use of physical resources for a second RAT type for the second active wireless session for the UE device; and coordinate, based on the determining, uplink scheduling for the first and second active wireless sessions to prioritize uplink signals for the second active wireless session at overlapping uplink time intervals for the first and second active wireless sessions.

11. The device of claim 10, wherein, when determining that expanded coverage is needed, the processor is further configured to:

receive, from the second scheduling function, a signal quality measurement for the second active wireless session.

12. The device of claim 10, wherein, when coordinating the uplink scheduling, the processor is further configured to:

schedule the UE device to not share transmit power for the first active wireless session and the second active wireless session during the overlapping uplink time intervals.

13. The device of claim 10, wherein, when coordinating the uplink scheduling, the processor is further configured to:

schedule the UE device to reduce transmit power for the first active wireless session, relative to the second active wireless session, during the overlapping uplink time intervals.

14. The device of claim 10, wherein the device further includes another processor configured to execute the second scheduling function.

15. The device of claim 10, wherein, when coordinating the uplink scheduling, the processor is further configured to:

exchanging scheduling information for the first and second active wireless sessions via a dedicated UE schedule coordination link.

16. The device of claim 10, wherein, when coordinating the uplink scheduling, the processor is further configured to:

retrieve, by the first scheduling function, scheduling patterns used by the second scheduling function for the second active wireless session.

17. A non-transitory computer-readable medium containing instructions executable by at least one processor of an access station in a radio access network, the instructions configured for:

identifying, by a first scheduling function of a radio access network, a User Equipment (UE) device that has a first active wireless session over the radio access network and a second active wireless session over the radio access network, wherein the first scheduling function schedules use of physical resources for a first Radio Access Technology (RAT) type for the first active wireless session for the UE device;

determining, by the first scheduling function and based on a signal from a second scheduling function of the radio access network, that expanded coverage is needed for an uplink transmission for the second active wireless session, wherein the second scheduling function schedules use of physical resources for a second RAT type for the second active wireless session for the UE device; and coordinating, by the first scheduling function and based on the determining, uplink scheduling for the first and second active wireless sessions to prioritize uplink signals for the second active wireless session at overlapping uplink time intervals for the first and second active wireless sessions.

18. The non-transitory computer-readable medium of claim 17, wherein the uplink scheduling includes a schedule for Time Division Duplex (TDD) time intervals of the second active wireless session.

19. The non-transitory computer-readable medium of claim 17, wherein the instructions for coordinating the uplink scheduling are further configured for:

exchanging scheduling information for the first and second active wireless sessions via a dedicated UE schedule coordination link.

20. The non-transitory computer-readable medium of claim 17, wherein the instructions for coordinating the uplink scheduling are further configured for:

altering a transmit power split ratio to favor an uplink transmit power for the second active wireless session over an uplink transmit power for the first active wireless session.

* * * * *